United States Patent
Labuschagne

(10) Patent No.: US 7,271,572 B2
(45) Date of Patent: Sep. 18, 2007

(54) APPARATUS AND METHODS FOR PROVIDING A VOLTAGE ADJUSTMENT FOR SINGLE-PHASE VOLTAGE REGULATOR OPERATION IN A THREE-PHASE POWER SYSTEM

(75) Inventor: Casper A. Labuschagne, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 11/368,827

(22) Filed: Mar. 6, 2006

(65) Prior Publication Data
US 2007/0090811 A1 Apr. 26, 2007

Related U.S. Application Data

(60) Provisional application No. 60/729,391, filed on Oct. 24, 2005.

(51) Int. Cl.
G05F 1/12 (2006.01)
H01F 30/12 (2006.01)
(52) U.S. Cl. .................... 323/264; 323/361
(58) Field of Classification Search ............ 315/288, 315/137, 138, 139, 141, 143, 144; 323/212, 323/215, 355, 361, 216, 247, 264; 307/103, 307/31, 32, 52; 361/52
See application file for complete search history.

(56) References Cited

U.S. PATENT DOCUMENTS

| 4,413,189 A | 11/1983 | Bottom |
|---|---|---|
| 4,419,619 A | 12/1983 | Jindrick |
| 4,612,617 A | 9/1986 | Laplace |
| 4,623,834 A | 11/1986 | Klingbiel |
| 4,630,220 A | 12/1986 | Pickenpaugh |
| 4,695,737 A * | 9/1987 | Rabon et al. .............. 307/31 |
| 5,055,766 A | 10/1991 | McDermott |

(Continued)

FOREIGN PATENT DOCUMENTS

WO   WO 95/24014   9/1995

(Continued)

OTHER PUBLICATIONS

Cooper Power Systems, CL-6 Series Control Installation, Operation, and Maintenance Instructions, Jul. 2004.

(Continued)

*Primary Examiner*—Thuy Vinh Tran
(74) *Attorney, Agent, or Firm*—Cook, Alex, McFarron, Manzo, Cummings & Mehler, Ltd.

(57) ABSTRACT

Provided is an apparatus and method for providing a voltage reduction for single-phase voltage regulator operation in a three-phase power system. The voltage regulator includes a plurality of tap positions selectable to adjust a voltage at a load to an in-band area. The method includes determining a measured voltage and current at the voltage regulator, determining a line voltage drop between the voltage regulator and the load if the measured voltage in the OOB area above the in-band area, and utilizing the measured voltage to lower the voltage at the load if there are no available taps. The method also includes utilizing the measured voltage less the line voltage drop to determine the tap change if there are available taps.

52 Claims, 6 Drawing Sheets

U.S. PATENT DOCUMENTS

| | | | |
|---|---|---|---|
| 5,117,174 A | 5/1992 | Kessler | |
| 5,136,233 A | 8/1992 | Klinkenberg | |
| 5,210,443 A | 5/1993 | Kugler | |
| 5,315,527 A * | 5/1994 | Beckwith | 702/72 |
| 5,430,598 A | 7/1995 | Rodolfo | |
| 5,450,002 A | 9/1995 | Dunk | |
| 5,451,923 A | 9/1995 | Seberger | |
| 5,455,505 A | 10/1995 | Laplace | |
| 5,500,806 A | 3/1996 | Bellin | |
| 5,510,697 A | 4/1996 | Dormer | |
| 5,530,338 A * | 6/1996 | Beckwith | 323/255 |
| 5,541,498 A * | 7/1996 | Beckwith | 323/211 |
| 5,544,064 A * | 8/1996 | Beckwith | 700/293 |
| 5,550,460 A | 8/1996 | Bellin | |
| 5,552,696 A | 9/1996 | Trainor | |
| 5,581,173 A * | 12/1996 | Yalla et al. | 323/257 |
| 5,621,439 A | 4/1997 | Okada | |
| 5,642,007 A | 6/1997 | Gyugyi et al. | |
| 5,646,512 A * | 7/1997 | Beckwith | 323/257 |
| 5,844,550 A | 12/1998 | Trainor | |
| 5,932,997 A | 8/1999 | James | |
| 6,137,277 A * | 10/2000 | Rajda et al. | 323/301 |
| 6,288,881 B1 | 9/2001 | Melvin | |
| 6,404,655 B1 * | 6/2002 | Welches | 363/41 |
| 6,507,178 B2 | 1/2003 | Cocetta | |
| 6,573,691 B2 * | 6/2003 | Ma et al. | 323/209 |
| 6,768,370 B2 | 7/2004 | Takahashi | |
| 6,911,853 B2 | 6/2005 | Kizer | |
| 2002/0046354 A1 | 4/2002 | Ostrom | |
| 2003/0016001 A1 | 1/2003 | Borup | |

FOREIGN PATENT DOCUMENTS

WO    WO 2004/001431    12/2003

OTHER PUBLICATIONS

Maschinenfabrik Reinhausen, Voltage Regulator Tapcon-230 Operating Instructions BA 225/02, 2002.

* cited by examiner

APPARATUS AND METHODS FOR PROVIDING A VOLTAGE ADJUSTMENT FOR SINGLE-PHASE VOLTAGE REGULATOR OPERATION IN A THREE-PHASE POWER SYSTEM

CROSS-REFERENCE TO RELATED APPLICATIONS

This application claims benefit under 35 U.S.C. §119(e) of U.S. Provisional Application entitled "An Apparatus and Methods for Providing Voltage Reduction for Single-Phase Voltage Regulator Operation in a Three-Phase Power System", filed on Oct. 24, 2005, having Ser. No. 60/729,391, naming Casper A. Labuschagne as inventor, the complete disclosure thereof being incorporated by reference.

BACKGROUND OF THE INVENTION

The present invention generally relates to power system control, and more specifically, to an apparatus and methods for providing a voltage adjustment for single-phase voltage regulator operation in a three-phase power system.

Electric utility systems or power systems are designed to generate, transmit and distribute electrical energy to loads via a variety of power system elements such as electrical generators, electrical motors, power transformers, power transmission lines, distribution lines, buses and transformers, power transmission lines, distribution lines, buses and capacitors, to name a few. As a result, power systems typically include a number of regulators having associated control devices, and many protective devices having associated protective schemes to protect the power system elements from abnormal conditions such as electrical short circuits, overloads, frequency excursions, voltage fluctuations, and the like.

In general, protective devices and their associated protective schemes act to isolate a power system element(s) (e.g., a generator, transformers, buses, motors, etc.) from the remainder of the power system upon detection of the abnormal condition or a fault in, or related to, the power system element(s). Such protective devices may include different types of protective relays, surge protectors, arc gaps and associated circuit breakers and reclosures.

Regulators and their associated control devices are utilized to regulate the voltage level in the power system. For example, a number of single-phase step voltage regulators may be coupled to the various transmission, sub-transmission and distribution lines (collectively, "distribution lines") to enable voltage regulation of the distribution line to, for example 13 kV±10 percent, during a wide range of load conditions (e.g., a plant coming on-line). Such voltage regulators are often located adjacent to a step-down power transformer and generally include an autotransformer having a single winding (e.g., a series winding), which is tapped at some tap position along the winding to provide a desired voltage level.

A typical step voltage regulator may have a 100 percent exciting winding in shunt with the distribution line on the source side, and operate to maintain a voltage on the load side of the distribution line. The voltage is maintained within a desired voltage bandwidth by means of a 10 percent tapped buck/boost winding connected in series with the distribution line. The series winding has taps connected to stationary contacts of a tap changer dial switch, where the tap changer dial switch includes a pair of rotatable selector contacts driven by a reversible motor into sequential engagement with the pairs of contacts. For example, the tap changer dial switch may enable a capability to change the effective turns ratio from input to output ±10 percent in 32 steps of ⅝ percent each or 0.75 V. A voltage control device, operatively coupled to the voltage regulator may also be included to select the proper tap position or tap for voltage regulator operation based on power system conditions.

Voltage regulators operate via a comparison of an actual measured voltage (i.e., a secondary distribution line voltage) to some internal fixed reference voltage, or center-band voltage. A voltage difference is amplified and used to control operation of the voltage regulator via the voltage control device. Thus, if the measured voltage is too high or in a first out of band (OOB) area above an in-band area, the voltage regulator is directed by the voltage control device to execute a tap change to yield a lower voltage. If the measured voltage is too low, or in a second OOB area below the in-band area, the voltage regulator is directed by the voltage control device to execute a tap change (e.g., a one tap position change) to yield a higher voltage.

Because currents resulting from a fault can easily exceed 10,000 amperes (amps) and because the voltage control device is designed to utilize currents and voltages much less than those of the distribution lines, the currents and voltages are stepped-down via current and voltage transformers, respectively. As is known, the three-phase current and voltages are commonly referred to as the primary current and voltages, while the stepped-down current and voltages are referred to as the secondary current and voltages, respectively. The stepped-down secondary current and voltages are digitized and utilized to determine corresponding phasors representative of the primary current and voltages. The phasors may then used while executing the voltage control logic scheme of the voltage control device to determine whether a tap change is required by the voltage regulator (discussed below).

In some cases, the voltage control device may cause a tap limit to be reached; that is, due to lower measured voltages over time, the voltage control device causes the voltage regulator to continue to change taps to increase the voltage delivered to the load until there are no more available taps. As a result, further decreases in the load voltage can not be addressed via a tap change.

The problem of the tap limit may be addressed by adjusting the center-band voltage to a lower voltage via subtracting a percentage of the center-band voltage setting from the center-band voltage setting, thereby effectively lowering the reference voltage used by the voltage control device. For example, using Kirchoff's law, $V=I*Z$, if the center-band voltage setting is decreased from 120 V to 118 V, a constant impedance load will draw less current, thereby reducing the overall system load. Although lowering the center-band voltage setting is effective when the load is predominantly of the constant impedance type, it does not always result in a smooth "system voltage" profile.

SUMMARY OF THE INVENTION

Disclosed is an apparatus and methods to enable improved single-phase voltage regulator control by bypassing line drop compensation for a distribution line between the single-phase voltage regulator and a load in a three-phase power system. Also disclosed is an apparatus and methods to enable improved single-phase voltage regulator control by incrementally reducing line drop compensation for a distribution line between the single-phase voltage regulator and a load in a three-phase power system.

In accordance with an aspect of the invention, a method provides a voltage adjustment for single-phase voltage regulator operation of a voltage regulator operatively coupled to a single-phase distribution line of a three-phase power system. The voltage regulator includes a plurality of taps selectable to adjust a voltage at a load of the single-phase distribution line to an in-band area. The method includes determining a measured voltage and a measured current based on a respective digitized voltage signal and a digitized current signal of the single-phase distribution line at the voltage regulator, and if there are no available taps and the measured voltage is in the out-of-band area above the in-band area, eliminating an effect of a line voltage drop between the voltage regulator and the load to adjust the voltage at the load.

In accordance with another aspect of the invention, a method provides a voltage adjustment for single-phase voltage regulator operation of a voltage regulator operatively coupled to a single-phase distribution line of a three-phase power system. The voltage regulator includes a plurality of taps selectable to adjust a voltage at a load of the single-phase distribution line to an in-band area. The method includes determining a measured voltage and a measured current based on a respective digitized voltage signal and a digitized current signal of the single-phase distribution line at the voltage regulator, determining a line voltage drop between the voltage regulator and the load if the measured voltage is in an out-of-band area above the in-band area, and if there are no available taps, reducing an effect of the line voltage drop to adjust the voltage at the load.

In accordance with a yet another aspect of the invention, an apparatus and method provides a voltage adjustment for single-phase voltage regulator operation of a voltage regulator operatively coupled to a single-phase distribution line of a three-phase power system. The voltage regulator includes a plurality of taps selectable to adjust a voltage at a load of the single-phase distribution line to an in-band area. The apparatus includes a means for deriving a digitized voltage signal and a digitized current signal of the single-phase distribution line at the voltage regulator, and a microcontroller operatively coupled to the means for deriving. The microprocessor is programmed to determine a measured voltage and a measured current based on the respective digitized voltage signal and the digitized current signal, to determine a line voltage drop between the voltage regulator and the load if the measured voltage is in an out-of-band area above the in-band area, and if there are no available taps of the plurality of taps, utilize the measured voltage to adjust (lower) the voltage at the load when the measured voltage is in an out-of-band area above the in-band area. Utilization of only the measured voltage bypasses an effect of the line voltage drop on the adjustment of the voltage at the load to yield a voltage reduction for single-phase voltage regulator operation of the voltage regulator. In cases where the measured voltage is in an out-of-band area below the in-band area and there are no available taps, the microcontroller is programmed to utilize the measured voltage plus a reduction voltage to adjust (further lower) the voltage at the load. If there are available taps, the microcontroller is programmed to utilize the measured voltage less the line voltage drop to determine a tap change of the plurality of taps when the measured voltage is in the out-of-band area above the in-band area.

In accordance with a further aspect of the invention, an apparatus and method provides a voltage adjustment for single-phase voltage regulator operation of a voltage regulator operatively coupled to a single-phase distribution line of a three-phase power system. The voltage regulator includes a plurality of taps selectable to adjust a voltage at a load of the single-phase distribution line to an in-band area. The apparatus includes a means for deriving a digitized voltage signal and a digitized current signal of the single-phase distribution line at the voltage regulator, and a microcontroller operatively coupled to the means for deriving. The microcontroller is programmed to determine a measured voltage and a measured current based on the respective digitized voltage and current signals, to determine a line voltage drop between the voltage regulator and the load if the measured voltage is in the out-of-band area above the in-band area, to divide the line voltage drop by a tap voltage value of a single tap of the plurality of taps to form a required taps value, and if the required taps value is greater than a number of available taps of the plurality of taps, to utilize the measured voltage less another line voltage drop to adjust the voltage at the load. The another line drop voltage is less than the line drop voltage and is based on the required taps value. The microcontroller is further programmed to divide the number of available taps by the required taps value to form a line drop compensation adjustment value, to multiply a line impedance of the single-phase distribution line by the line drop compensation adjustment value to form another line impedance, and to multiply the another line impedance by a total current of the single-phase distribution line to calculate the another line voltage drop. Utilization of the measured voltage less the another line voltage drop reduces an effect of the line voltage drop to yield the voltage reduction for single-phase voltage regulator operation of the voltage regulator. In cases where the measured voltage is in an out-of-band area below the in-band area and there are no available taps, the microcontroller is programmed to utilize the measured voltage plus a reduction voltage to adjust (further lower) the voltage at the load.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

Methods are provided in a voltage control device for providing voltage reduction for single-phase voltage regulator operation in a three-phase power system. As noted above, the problem of exceeding the tap limit may be addressed by lowering the center-band voltage setting. Lowering the center-band voltage setting may result however, in an uneven system voltage profile or large system voltage changes.

Figure 1:
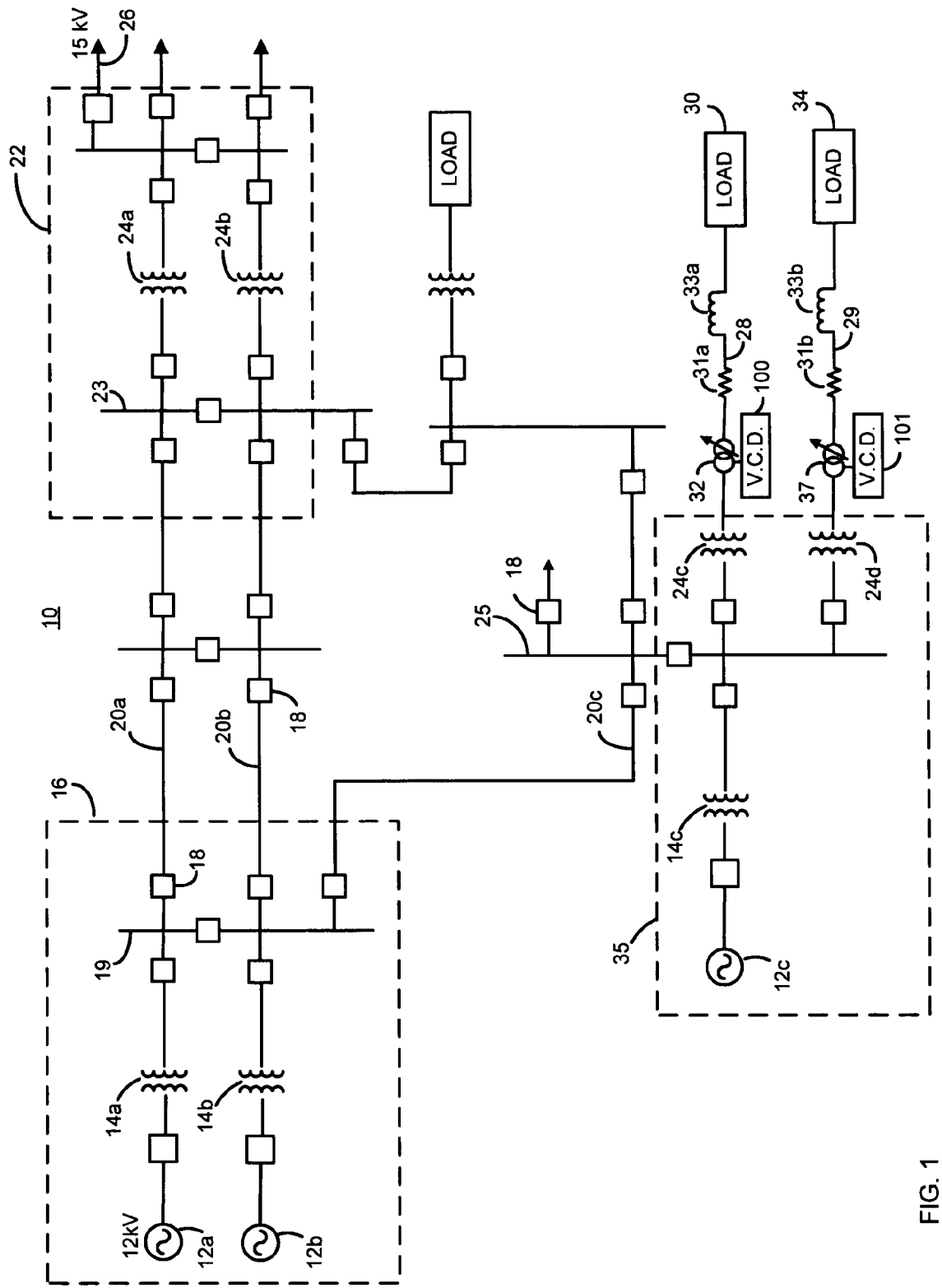
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, three generators 12a, 12b and 12c, configured to generate three-phase sinusoidal waveforms such as 12 kV sinusoidal waveforms, three step-up power transformers 14a, 14b and 14c, configured to increase the generated waveforms to a higher voltage sinusoidal waveforms such as 138 kV sinusoidal waveforms and a number of circuit breakers 18. The step-up power transformers 14a, 14b, 14c operate to provide the higher voltage sinusoidal waveforms to a number of long distance transmission lines such as the transmission lines 20a, 20b and 20c. In an embodiment, a first substation 16 may be defined to include the two generators 12a and 12b, the two step-up power transformers 14a and 14b and associated circuit breakers 18, all interconnected via a first bus 19. A second substation 35 may be defined to include the generator 12c, the step-up power transformer 14c and associated circuit breakers 18, all interconnected via a second bus 25. At the end of the long distance transmission lines 20a, 20b, a third substation 22 includes two step-down power transformers 24a and 24b configured to transform the higher voltage sinusoidal waveforms to lower voltage sinusoidal waveforms (e.g., 15 kV) suitable for distribution via one or more distribution lines.

As illustrated, the second substation 35 also includes two step-down power transformers 24c and 24d on respective distribution lines 28 and 29 to transform the higher voltage sinusoidal waveforms, received via the second bus 25, to lower voltage sinusoidal waveforms. A (line) voltage regulator 32 is included on the load side of the power transformer 24c to provide voltage regulation for the load 30, and a voltage regulator 37, identically configured and operable as the voltage regulator 32, is included on the load side of the power transformer 24d to provide voltage regulation to the load 34. For example, the voltage regulator 32 may be designed to provide 13 kV±10% for distribution via an A-phase distribution line 28 to the load 30.

Voltage control devices 100 and 101 are operatively coupled to respective voltage regulators 32, 37, and execute a voltage control scheme (discussed below), to provide control for their associated voltage regulators 32, 37. Although illustrated as a single line schematic diagram for ease of discussion, it should be noted that each of the A-, B- and C-phase distribution lines may include a single-phase voltage regulator such as the voltage regulator 32 and an associated voltage control device such as the voltage control device 100.

Figure 2:
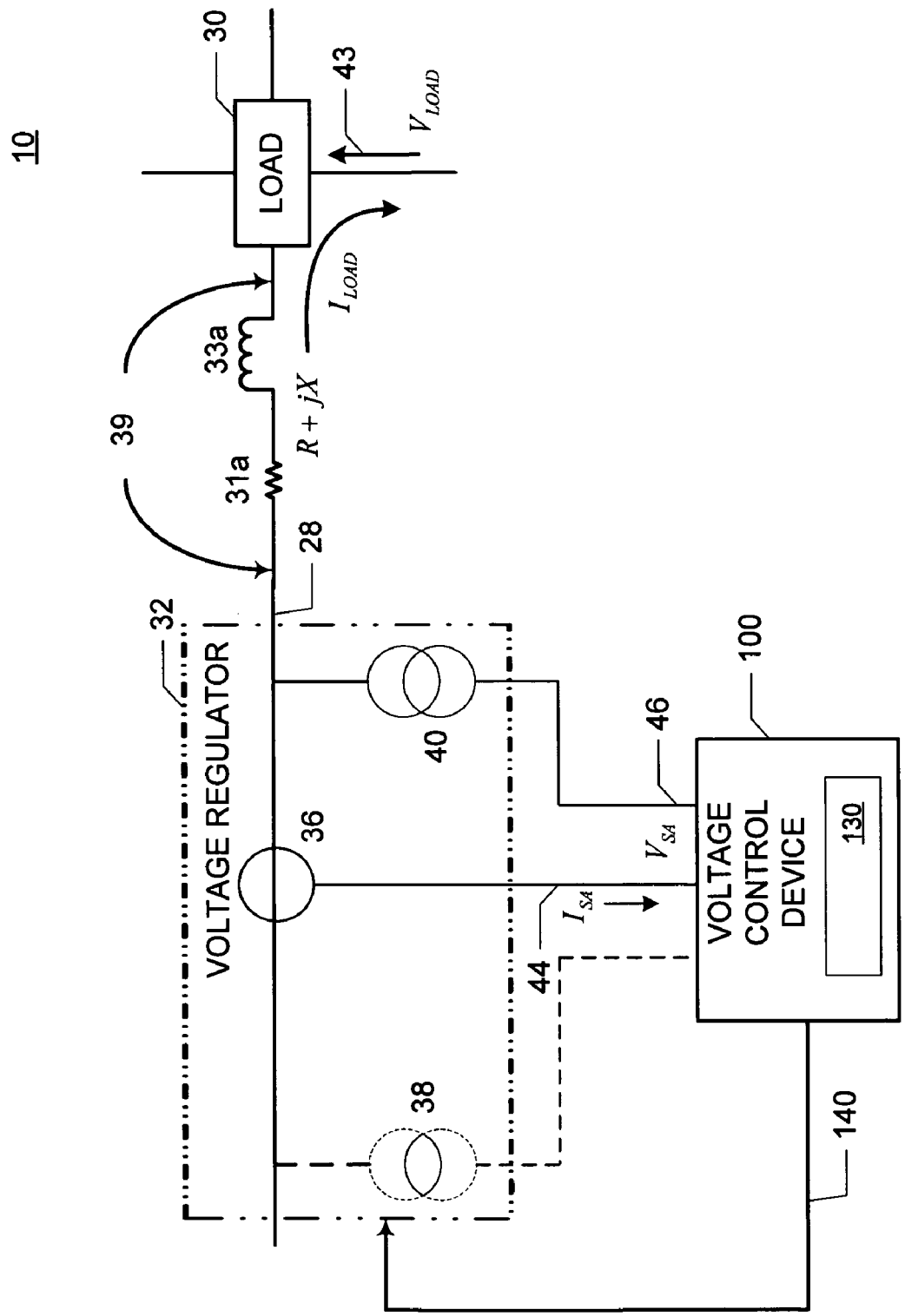
FIG. 2 is a schematic diagram illustrating a configuration of the voltage regulator with voltage control device of FIG. 1, according to an embodiment of the invention.

FIG. 2 is a schematic diagram illustrating a configuration of the voltage regulator 32 with the voltage control device 100, according to an embodiment of the invention. As noted above, each phase distribution line of the A-, B- and C-phase power system may include its own voltage regulator and voltage control device. For ease of discussion and example however, the voltage regulator 32 and the voltage control device 100 are operatively coupled to an A-phase distribution line 28.

As was also noted above, because the voltage control device 100 is designed to utilize currents and voltages much less than those of a distribution line such as, for example, the A-phase distribution line 28, transformers are provided. In the illustrated example, the voltage control device 100 is coupled to the A-phase distribution line 28 via one current transformer 36 and one voltage transformer 40. The voltage transformer 40 is used to step-down the power system voltage to a secondary voltage waveform $V_{SA}$ 46 having a magnitude that can be readily monitored and measured by the voltage control device 100 (e.g., to step-down the distribution line voltage from 13 kV to 120 V). Similarly the current transformer 36 is utilized to proportionally step-down the power system line current to a secondary current $I_{SA}$ 44 having a magnitude that can be readily monitored and measured by the voltage control device 100 (e.g., step-down the distribution line current from 200 amps to 0.2 amps). A second voltage transformer 38 may also be included for use during a reverse load condition (i.e., a generator is switched in on the load side). As shown, each of the current transformer 36 and the voltage transformer(s) 40 are included in the voltage regulator 32, however other arrangements of the voltage regulator 32, the voltage control device 100 and associated transformers are contemplated.

Figure 3:
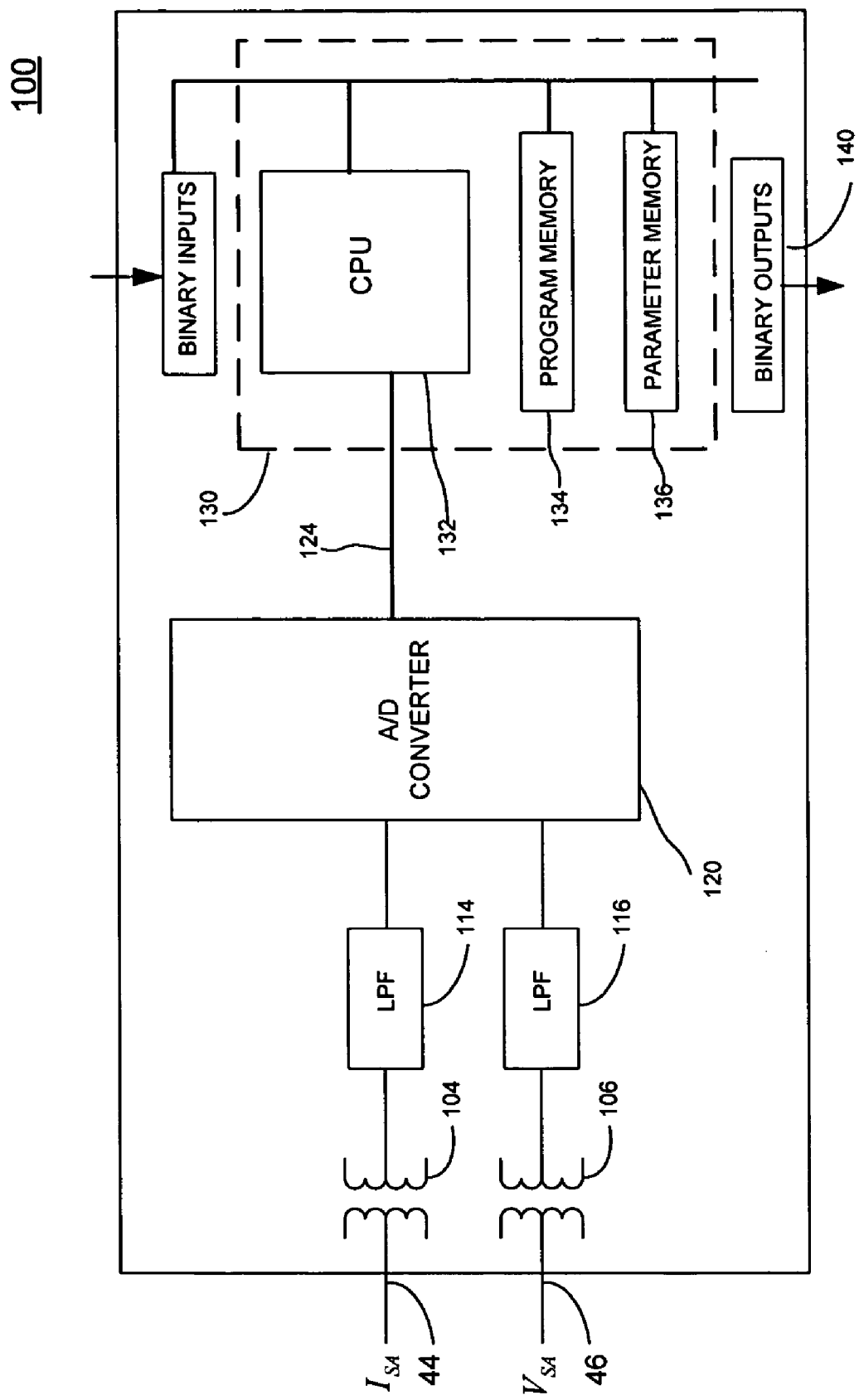
FIG. 3 is a block diagram of an exemplary configuration of the voltage control device of FIG. 2.

When received by the voltage control device 100, the A-phase secondary current and A-phase-to-ground voltage are filtered, processed and utilized by a microcontroller 130 to calculate phasors having corresponding magnitudes and phase angles. The phasors are used to determine whether a tap change is needed to adjust the load voltage back into the center-band (e.g., 120 V). FIG. 3 is a block diagram of an exemplary configuration of the voltage control device 100. During operation of the voltage control device 100, the secondary current waveform $I_{SA}$ 44 resulting from the current transformer 36 is further transformed into a corresponding voltage waveform via a current transformer 104 and a resistor (not separately illustrated), and filtered via an analog low pass filter 114. The secondary voltage waveform $V_{SA}$ 46 resulting from the voltage transformer 40 is similarly processed and filtered via another analog low pass filter 116. An analog-to-digital (A/D) converter 120 then multiplexes, samples and digitizes the filtered secondary current and secondary voltage waveforms to form a corresponding digitized current and voltage signal 124.

The corresponding digitized current and voltage signal 124 is received by a microcontroller 130, where it is digitally filtered via, for example, Cosine filters to eliminate DC and unwanted frequency components. In an embodiment, the microcontroller 130 includes a CPU, or a microprocessor 132, a program memory 134 (e.g., a Flash EPROM) and a parameter memory 136 (e.g., an EEPROM). As will be appreciated by those skilled in the art, other suitable microcontroller configurations (or FPGA configurations) may be utilized. Further, although discussed in terms of a microcontroller, it should be noted that the embodiments presented and claimed herein may be practiced using an FPGA or other equivalent.

The microprocessor 132, executing a computer program or voltage control logic scheme (discussed below in connection to FIG. 4), processes (each on the digitized current and voltage signal 124 to extract phasors representative of a corresponding measured secondary voltage $V_{SA}$ and current $I_{SA}$ 44, and then performs various calculations using the phasors to determine whether the measured secondary voltage $V_{SA}$ 46 is in either of the first or second OOB areas 154, 156. If such an OOB condition occurs, the microprocessor 132 issues a tap change command to the voltage regulator 32 to cause a tap change (i.e., change the effective turns ratio) to adjust the A-phase-to-ground voltage to the desired center-band voltage, or reference voltage.

Figure 4:
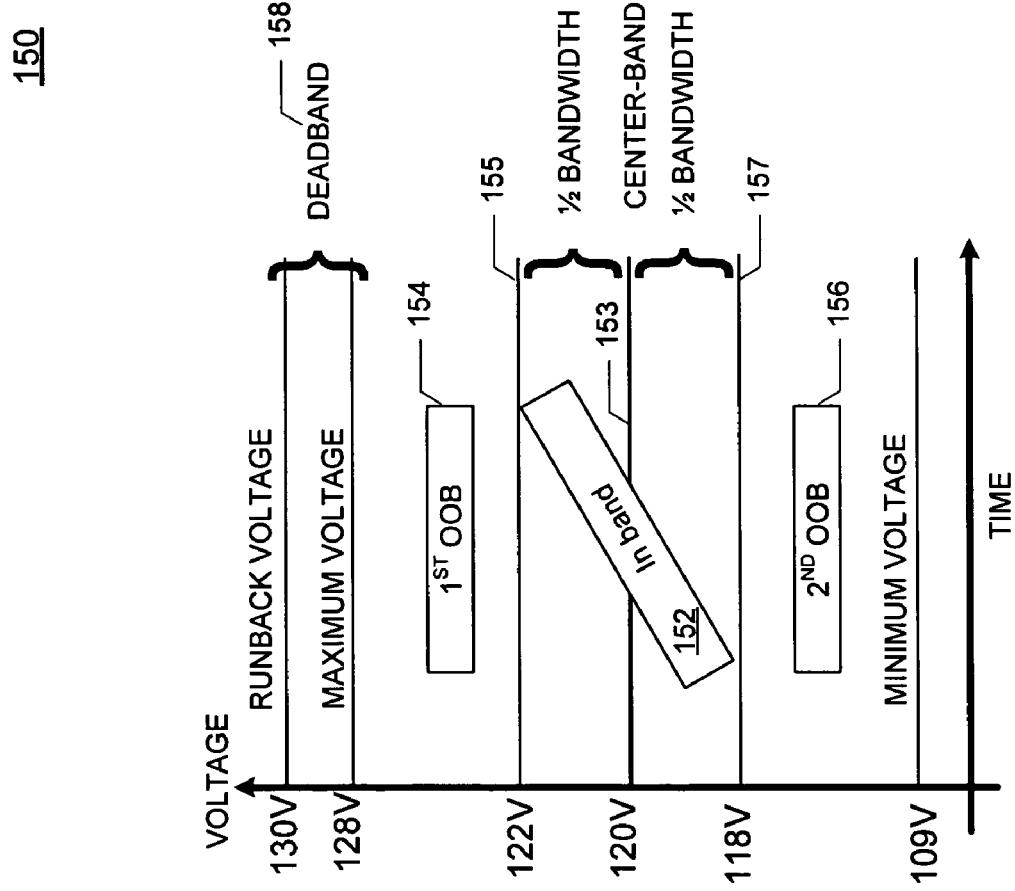
FIG. 4 is an exemplary graphic illustrating the in-band area and associated out-of-band areas that may be used by the voltage control device of FIG. 2, according to an embodiment of the invention.

As was noted above, voltage regulators generally operate via a comparison of an actual measured secondary voltage $V_{SA}$ to some internal fixed reference voltage, typically the center-band voltage 153. FIG. 4 is an exemplary graphic 150 illustrating the in-band area 152, including the center-band voltage 153, and associated OOB areas 154, 156 that may be used by the voltage control device of 100, according to an embodiment of the invention. Although assigned voltage values for discussion purposes, it should be noted that the in-band area 152 and the first and second OOB areas 154, 156 may include different voltage values.

As illustrated, a center-band voltage 153 included within an in-band area 152 is selected to be 120 V±2V for a total in-band area width of 4 V. As a result, the first OOB area 154 begins at a first in-band/OOB edge 155 at 122V and extends upward beyond 128V, where 128V is the maximum voltage above which tap RAISE commands are suspended by the voltage control device 100. The second OOB area 156 begins at a second in-band/OOB edge 157 at 118V and extends downward beyond 109V, where 109V is the minimum voltage below which tap LOWER commands are suspended by the voltage control device 100. A deadband area 158 is established between 128V and a runback voltage of 130V in order to effect fast voltage correction because of an extreme voltage condition. When the measured secondary voltage is equal to or above the runback voltage, the voltage control device 100 issues a tap LOWER command without any time delay.

Referring again to FIG. 1, because the distribution lines 28 and 29 of the second substation 35 may not draw the same current due to their respective different loads 30 and 34, regulating the measured voltage at the second substation 35 may result in undesirable high voltages on lightly-loaded distribution lines and undesirable low voltage on heavily loaded distribution lines. The problem of undesirable high and low voltages on distribution lines due to load variations may be addressed via compensating for the voltage drop across, for example, the A-phase distribution line 28 between the voltage regulator 32 and the load 30. Compensating for the voltage drop between the voltage regulator 32 and the load 30, or the use of a "line drop compensation" scheme, enables the voltage control device 100 to cause voltage regulator tap changes to regulate the voltage at the load 30 (i.e., the load voltage 43), rather than at the second substation 35.

In order to regulate voltages at their respective loads, the voltage control device 100 determines tap changes based on a calculated controller voltage $V_{CONTROLLER}$ that includes distribution line voltage drops, or line voltage drops 39, and is therefore lower than the measured secondary voltage $V_{SA}$ 46 provided to it by the voltage transformer 40. As a result, the voltage control device 100 via the voltage regulator 32 regulates the overall system, or load voltage to a level that is higher than the reference voltage of the in-band area 152. When using such a line drop compensation scheme, the voltage control device 100 determines a tap change based on the controller voltage $V_{CONTROLLER}$ that includes the line voltage drop 39 reflected as distribution line parameters $(R+jX) \times I_{LOAD}$ of FIG. 2 between the voltage regulator 32 and its respective load 30. For example, rather than utilizing only a measured voltage sample $V_{MEASURED}$ of 121 V (derived from the secondary voltage $V_{SA}$ 46) provided by the voltage transformer 40 to the voltage control device 100 for purposes of regulating the load voltage 43, the microcontroller 130 utilizes a controller voltage $V_{CONTROLLER}$ of 119 V to regulate the load voltage 43 to a reference voltage value of 120. The controller voltage $V_{CONTROLLER}$ of 119 V reflects the measured voltage 46 of 121 V plus a line voltage drop $V_{LINEDROP}$ contribution of a 2 V loss (e.g., $V_{CONTROLLER} = V_{MEASURED} - V_{LINEDROP}$) between the voltage regulator 100 and the load 30. Using the principles discussed above and based on the controller voltage $V_{CONTROLLER}$ of 119 V, the microcontroller 130 causes a tap change (e.g., increase the tap position by one tap) to increase the controller voltage $V_{CONTROLLER}$ to 120 V, thereby effectively increasing the measured voltage sample $V_{MEASURED}$ to 122 V or 2 V above the reference voltage value of 120 V.

As a current of the load 30 ("load current") increases due to, for example, additional power needs, the load voltage 43 generally decreases. The decreased load voltage 43 results in a decreased measured voltage sample $V_{MEASURED}$ at the voltage regulator 32. As a result, the controller voltage $V_{CONTROLLER}$ is lower. If it is determined that the controller voltage $V_{CONTROLLER}$ is lower than the center-band voltage 153, a tap change occurs to increase the load voltage 43 (and the overall system voltage).

Figure 5:
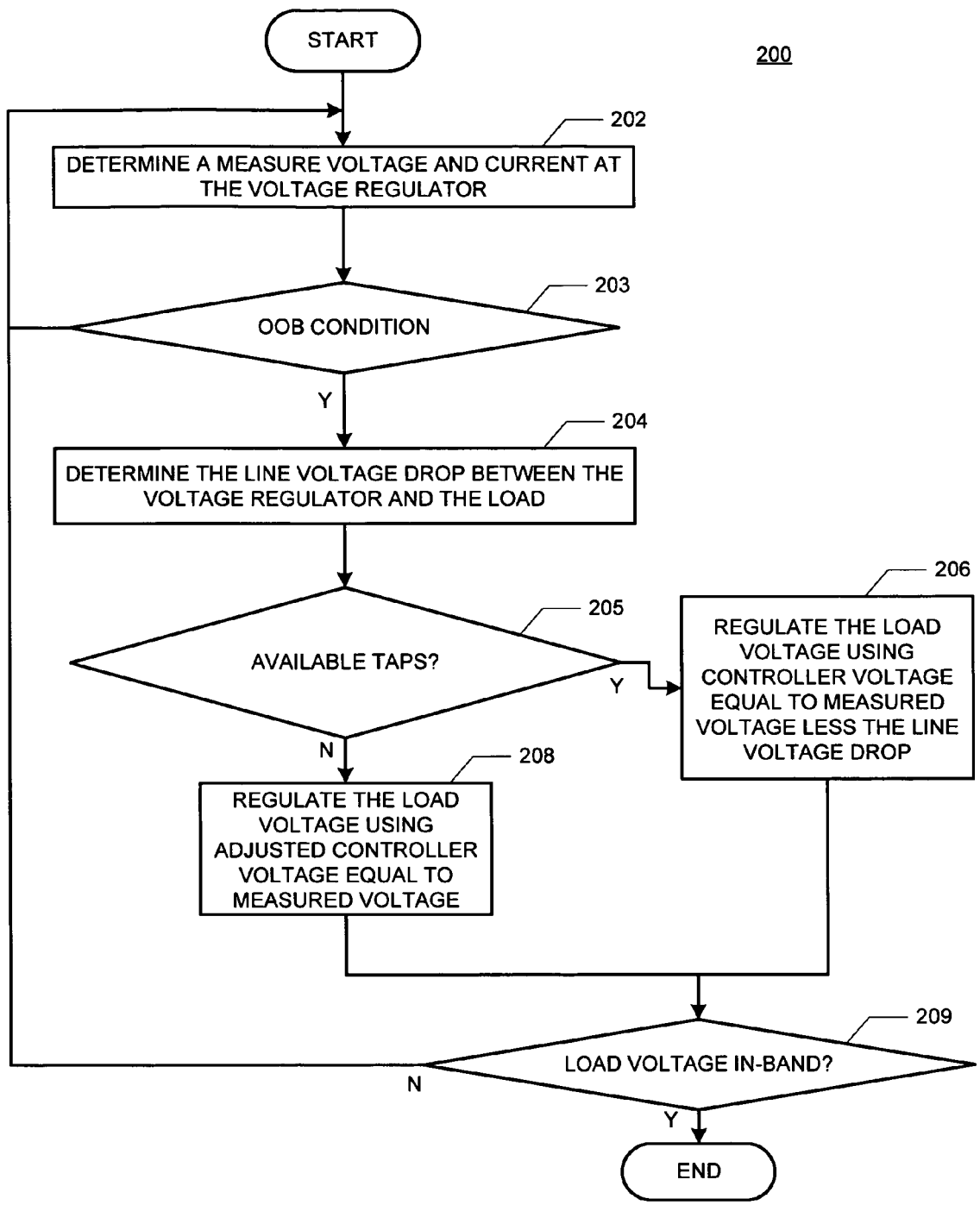
FIG. 5 is a flowchart of a single-step line drop compensation LDC bypassing method for providing voltage reduction when reaching the tap position limit of the single-phase voltage regulator of FIGS. 1 and 2, according to an embodiment of the invention.

As was also noted above, voltage reduction via lowering the reference voltage setting when reaching the tap limit of the voltage regulator 32 does not always provide a smooth system voltage profile. FIG. 5 is a single-step line drop compensation (LDC) bypassing method 200 for providing load voltage reduction when reaching the tap limit of the single-phase voltage regulator 32, according to an embodiment of the invention. Unlike prior art methods of adjusting the center-band voltage 153, the single-step LDC bypassing method 200 enables a voltage reduction that may result in a smoother system voltage profile. Although discussed below in terms of the distribution line 28 and its load 30, it should be noted that the single-step LDC bypassing method 200 is equally applicable to any regulated load voltage experiencing an OOB condition above the in-band area 152 (i.e., in the first OOB area 154). For purpose of discussion, it should also be noted that load voltage 43 may be defined to include a voltage at the load 30 defined by the distribution line parameters R+jX.

In general, the single-step LDC bypassing method 200 includes removing or bypassing the affects of the distribution line parameters R+jX from the controller voltage $V_{CONTROLLER}$ utilized by microcontroller 130 to lower the load voltage during an OOB condition when there are no available taps; that is, removing $V_{LINEDROP}$ from the controller voltage $V_{CONTROLLER}$ to form an adjusted controller voltage such that adjusted controller voltage $V_{CONTROLLER\_ADJUST} = V_{MEASURED}$ when it is determined that there are no available taps to regulate the load voltage 43 to the in-band area during an OOB condition (i.e., when the measured voltage is in the first OOB area 154). The net effect of removing $V_{LINEDROP}$ from the controller voltage is to raise the voltage utilized by the microcontroller 130 during an OOB condition, thereby resulting in an overall lower load voltage 43.

More specifically, referring to FIG. 5, the single-step LDC bypassing method 200 begins when the microcontroller 130 determines a measured voltage $V_{MEASURED}$ and a measured current $I_{MEASURED}$ (derived from $I_{SA}$ 44) at the voltage regulator 32 (step 202), and determines a line voltage drop $V_{LINEDROP}$, or the voltage drop across the distribution line 28 between the voltage regulator 32 and the load 30 (step 204) if an OOB condition above the in-band area 152 is detected (step 203). The measured voltage $V_{MEASURED}$ at the voltage regulator 32 is based on a digitized voltage signal representative of the secondary voltage waveform $V_{SA}$ 46 provided by the voltage transformer 40. The line voltage drop $V_{LINEDROP}$ may be affected by a number of factors including the material used in the distribution line, the configuration and length of the distribution line, the weather, load needs, etc. and is characterized by the distribution line parameters R+jX. The line voltage drop $V_{LINEDROP}$ may be calculated using the total current $I_{TOTAL}$ and the line impedance $Z_{LINE}$=R+jX of the distribution line 28 between the voltage regulator 32 and the load 30 where $V_{LINEDROP}=I_{TOTAL}*Z_{LINE}$. In the illustrated example, calculation of the total current $I_{TOTAL}$ is based on the measured voltage $V_{MEASURED}$ derived from the (secondary) measured A-phase-to-ground/neutral voltage $V_{SA}$ 46 provided by the voltage transformer 40, and the total impedance $Z_{TOTAL}$, where $I_{TOTAL}=V_{MEASURED}/Z_{TOTAL}$. The total impedance $Z_{TOTAL}$ includes both the line impedance $Z_{LINE}$ and a load impedance $Z_{LOAD}$ where $Z_{TOTAL}=Z_{LINE}+Z_{LOAD}$. Therefore, using (1) the measured voltage(s) $V_{MEASURED}$ derived from the A-phase-to-ground/neutral voltage $V_{SA}$ 46, (2) a predetermined value for the line impedance $Z_{LINE}$ based on either a look-up table for the distribution line type and configuration, or based on a predetermined setting, and (3) the load impedance $Z_{LOAD}$ (provided via a communication means not separately shown), the microcontroller 130 can determine the line voltage drop $V_{LINEDROP}$ (step 204).

For example, in a first case for a $V_{MEASURED}=120\angle 0°$, an $I_{MEASURED}=0.2\angle 0-37°$, a line impedance $Z_{LINE}=5\angle 60°$ and a load impedance $Z_{LOAD}=120\angle 30°$, the microcontroller 130 calculates a total current $I_{TOTAL}=0.965\angle -31.152°$ where the $V_{MEASURED}=120\angle 0°$ is divided by a total impedance $Z_{TOTAL}=124.35\angle 31.152°$. The microcontroller 130 then calculates a line voltage drop $V_{LINEDROP}=4.825\angle 28.848°$ between the voltage regulator 32 and the load 30.

If the load impedance $Z_{LOAD}$ is not provided to the microcontroller 130, digitized measured current samples ("measured current") $I_{MEASURED}$ derived from the secondary current $I_{SA}$ 44 waveform provided by the A-phase current transformer 36 may be used rather than calculating the total current $I_{TOTAL}$ (the total current $I_{TOTAL}$ requiring $V_{MEASURED}$, and the sum of the known line impedance $Z_{LINE}$ and the load impedance $Z_{LOAD}$). In that case, the line voltage drop is equal to a product of the line impedance and the measured current $I_{MEASURED}$, where the measured current $I_{MEASURED}$ is about equal to a total current at the voltage regulator 32.

Referring again to FIG. 5, if there are available taps $Taps_{AVAILABLE}$ (step 205) during the OOB condition (step 203), the microcontroller 130 uses the controller voltage $V_{CONTROLLER}$ to determine a tap change, where the controller voltage $V_{CONTROLLER}$ includes the line voltage drop $V_{LINEDROP}$ (step 206), or $V_{CONTROLLER}=V_{MEASURED}-V_{LINEDROP}$. In other words, the measured voltage $V_{MEASURED}$ is reduced by the line voltage drop for use by the microcontroller 130 to determine a tap change to lower the load voltage.

If however, there are no taps available $Taps_{AVAILABLE}$, the microcontroller 130 uses an adjusted controller voltage $V_{CONTROLLER\_ADJUST}$ to regulate the load voltage 43 (step 208). The adjusted controller voltage does not include the line voltage drop $V_{LINEDROP}$. In that case $V_{CONTROLLER\_ADJUST}=V_{MEASURED}$, thereby resulting in an overall lower system or load voltage 43; a voltage reduction. If the voltage reduction does not yield an in-band load voltage, the process repeats (step 209).

Figure 6:
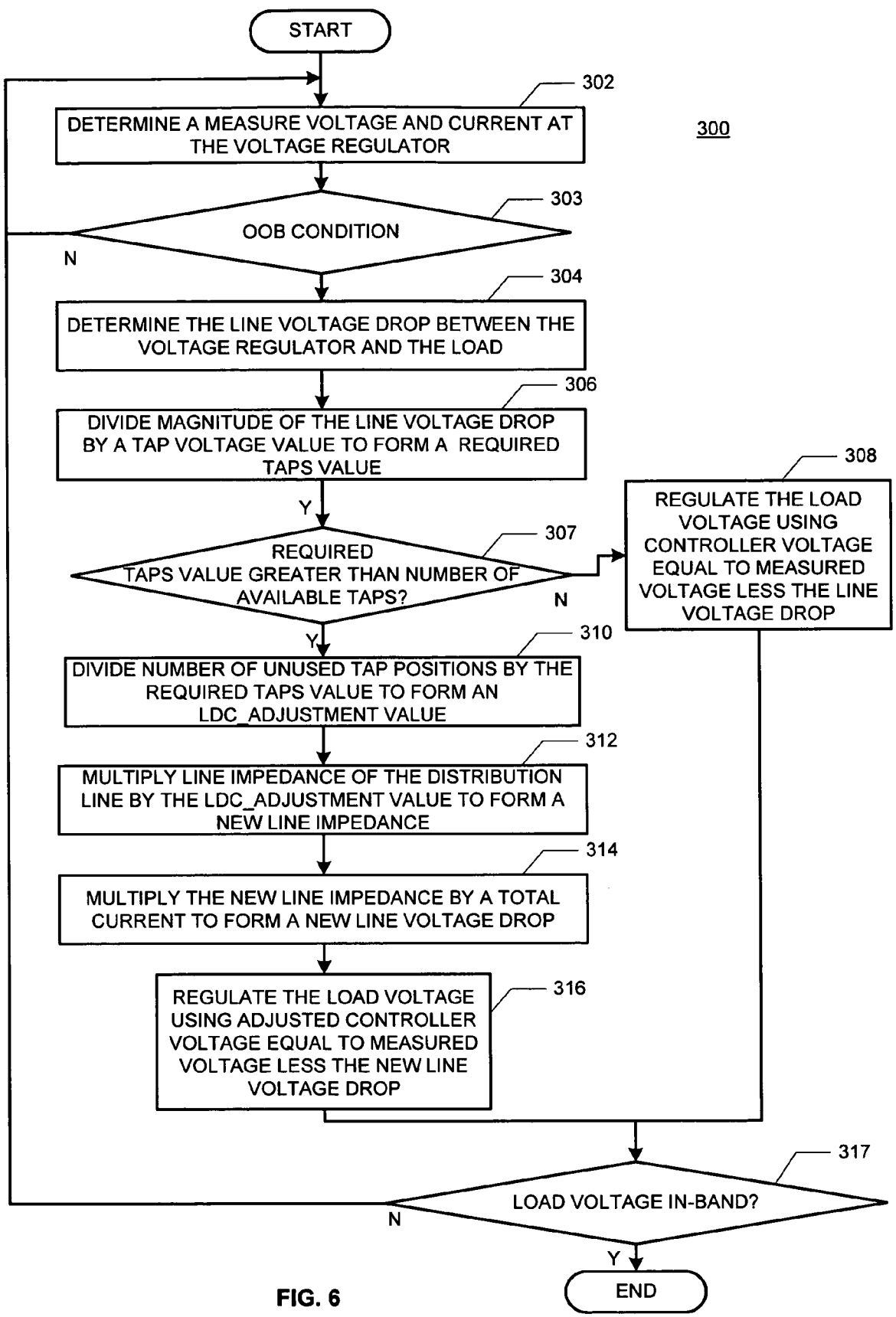
FIG. 6 is a flowchart of an incremental-step line drop compensation LDC method for providing voltage reduction before reaching the tap limit of the single-phase voltage regulator of FIGS. 1 and 2, according to an embodiment of the invention.

In some applications, it may be desirable to provide incremental reductions of the effect of the line voltage drop $V_{LINEDROP}$ on the controller voltage when regulating the load voltage. FIG. 6 is an incremental-step line drop compensation (LDC) method 300 for providing incremental load voltage reduction before reaching the tap limit of the single-phase voltage regulator 32, according to an embodiment of the invention. Unlike prior art methods where adjusting the center-band voltage may cause uneven system voltage profiles, the incremental-step LDC method 300 provides a smoother system voltage profile during OOB conditions 154 above the in-band area 152 due to incremental load voltage decrease. Although discussed below in terms of the distribution line 28 and its load 30, it should be noted that the incremental-step LDC method 300 is equally applicable to any regulated load voltage.

In general, the incremental-step LDC method 300 includes incrementally reducing the affects of the distribution line parameters R+jX on the controller voltage utilized by the microcontroller 130 (to calculate the load voltage) until the controller voltage $V_{CONTROLLER}$ does not include the line voltage drop $V_{LINEDROP}$. The net effect of incrementally reducing the line voltage drop $V_{LINEDROP}$ is an incremental increase in the controller voltage utilized by the controller 130 when calculating a tap change, thereby resulting in an incrementally lower system or load voltage 43.

Incremental reduction of the distribution line parameter effects R+jX on the controller voltage utilized by the microcontroller 130 may be initiated when the microcontroller 130 detects that a predetermined threshold has been exceeded. For example, the incremental reduction may begin when the microcontroller 130 detects that a required taps value exceeds the number of available taps $Taps_{AVAILABLE}$.

More specifically, referring to FIG. 6, the incremental-step LDC method 300 begins when the microcontroller 130 determines a measured voltage $V_{MEASURED}$ and a measured current $I_{MEASURED}$ at the voltage regulator 32 (step 302). If the measured voltage $V_{MEASURED}$ indicates an OOB condition above the in-band area 152 (step 303), the microcontroller 130 determines a line voltage drop $V_{LINEDROP}$, or the voltage drop across the distribution line 28 between the voltage regulator 32 and the load 30 (step 304). The line voltage drop $V_{LINEDROP}$ may be calculated as described above in connection with FIG. 5.

After calculating the line voltage drop $V_{LINEDROP}$ (step 304), the microcontroller 130 determines how many taps are represented by the magnitude of the calculated line voltage drop $V_{LINEDROP}$ via dividing magnitude of the line voltage drop $V_{LINEDROP}$ by a tap voltage value to form the required taps value $Taps_{REQUIRED}$ (step 306). The tap voltage value represents a voltage increment, either added or subtracted, by one tap change. For example, the tap voltage value may be 0.8 V per tap.

Next, the microcontroller 130 compares the required taps value $Taps_{REQUIRED}$ to the number of available taps $Taps_{AVAILABLE}$ (step 307). If the required taps value is less than or equal to the number of available taps $Taps_{AVAILABLE}$, the microcontroller 130 regulates, in this case lowers, the load voltage 43 using the controller voltage equal to the measured voltage $V_{MEASURED}$ less the line voltage drop $V_{LINEDROP}$ (step 308). In other words $V_{CONTROLLER}=V_{MEASURED}-V_{LINEDROP}$. As a result, the full effect of the distribution line parameters R+jX is included in the determination of a tap change to adjust the load voltage from the first OOB area 154 to the in-band area 152.

If, the required taps value is more than the number of available taps Taps$_{AVAILABLE}$ however, the microcontroller 130 calculates an LDC adjustment value (step 310). The LDC adjustment value is a value less than one, and is equal to the number of available taps Taps$_{AVAILABLE}$ divided by the required taps value, or LDC_Adjust=Taps$_{AVAILABLE}$/Taps$_{REQUIRED}$. Next the microcontroller 130 multiplies the line impedance Z$_{LINE}$ by the LDC adjustment value to form a new line impedance Z$_{LINE\_NEW}$ (step 312), and then multiplies the new line impedance Z$_{LINE\_NEW}$ by the total current I$_{TOTAL}$ to form a new line voltage drop V$_{LINEDROP\_NEW}$ (step 314). Thus, the new line impedance may be expressed as Z$_{LINE\_NEW}$=(LDC_Adjust)*Z$_{LINE}$ and the new voltage drop V$_{LINEDROP\_NEW}$ may be expressed as $$V_{LINEDROP\_NEW} = I_{TOTAL} * Z_{LINE\_NEW}.$$

The microcontroller 130 then regulates the load voltage 43 using an adjusted controller voltage V$_{CONTROLLER\_ADJUST}$ equal to the measured voltage V$_{MEASURED}$ less the new line voltage drop V$_{LINEDROP\_NEW}$ (step 316). In other words, the microcontroller 130 regulates the load voltage 43 using an adjusted controller voltage that includes an adjusted line voltage loss reflected as a portion of the distribution line parameters R+jX such that V$_{CONTROLLER\_ADJUST}$=|V$_{MEASURED}$|–|V$_{LINEDROP\_NEW}$|. The process of applying adjusted controller voltages to incrementally remove the effects of the distribution line parameters from the calculation to regulate the load voltage 43 may continue until either the load voltage 43 is in the in-band area 152 (step 317) or until the tap limit has been reached. In this way, the affect of the distribution line parameters R+jX on the controller voltage is incrementally phased out of the controller voltage utilized by the microcontroller 130 thereby incrementally lowering the load voltage 43. In other words, utilization of each sequential new line voltage drop by the microcontroller 130 incrementally "moves" the controller voltage, used to adjust the load voltage 43, away from the load voltage 43 and towards the measured voltage.

Referring to the example above and the incremental-step LDC bypassing method of FIG. 6, when V$_{MEASURED}$ equals 120∠0°, I$_{MEASURED}$ equals 0.965∠–31.152°, the line impedance Z$_{LINE}$ equals 5∠60°, the load impedance Z$_{LOAD}$ equals 120∠30°, and the line voltage drop V$_{LINEDROP}$ equals 4.825∠28.848°, if the tap voltage value equals 0.8 V per tap, the required number of taps, or Taps$_{REQUIRED}$, equals 6.

In a first case where six taps remain unused, (i.e., the number of available taps Taps$_{AVAILABLE}$ equals 6), the microcontroller 130 includes the full effect of the distribution line parameters R+jX in the determination of whether a tap change is required to adjust the load voltage 43 to the in-band area 152. Because the number of taps available equals the number of taps required, the LDC adjustment value is equal to 1. Upon calculating the new distribution line impedance (5∠60°) and the new line voltage drop (4.825∠28.85°) as discussed in connection with FIG. 6, the microcontroller 130 uses a new adjusted voltage of 115.175 V to regulate the load voltage 43, via a six tap change, to the in-band area 152.

In a second case where three taps remain unused, or the number of available taps Taps$_{AVAILABLE}$ equals 3, the microcontroller 130 incrementally phases out the affect of the distribution line parameters R+jX when regulating the load voltage 43 via tap changes. First, the microcontroller 130 calculates an LDC adjustment value of 0.5, or LDC_Adjust=3 taps/6 taps. Next, the microcontroller 130 multiplies line impedance Z$_{LINE}$ of 5∠60° by the LDC adjustment value of 0.5 to form a new distribution line impedance Z$_{LINE\_NEW}$ equal to 2.5∠60°, and then multiplies the new distribution line impedance 2.5∠60° by the total current 0.965∠–31.152° to form a new line voltage drop V$_{LINEDROP\_NEW}$ equal to 2.412∠28.85°. The microcontroller 130 then regulates the load voltage 43 via a tap change using the measured voltage sample 120∠0° less the line voltage drop of 2.412∠28.85°. In other words, the microcontroller 130 uses a new adjusted voltage of 117.59 V to regulate the load voltage 43, via a tap change, to the in-band area 152.

In a third case where no taps remain unused, or the number of available taps Taps$_{AVAILABLE}$ equals 0, the microcontroller 130 uses a new adjusted voltage of 120 V to regulate the load voltage 43 to the center-band voltage of 120 V. Accordingly, as shown by the three cases above utilizing the incremental-step LDC bypassing method 300, as the number of available taps Taps$_{AVAILABLE}$ decreases with respect to the number of taps required to adjust the load voltage 43 from an OOB area to an in-band area, the effect of the distribution line parameters on the load voltage regulation decreases, thereby increasing the new adjusted voltage incrementally to the in-band area 152, and decreasing the system or load voltage.

In some cases, bypassing or incrementally reducing the effects of the distribution line parameters R+jX when regulating the load voltage 43 to the center-band voltage 153 may not provide the needed load voltage 43 decrease. Accordingly, voltage reduction via lowering the center-band voltage 153 may additionally be used after executing either of the single-step LDC bypassing method or the incremental-step LDC method 300 described above.

For example, after bypassing the distribution line parameters R+jX as described above, the microcontroller 130 may perform one or more voltage reductions via lowering the center-band voltage 153 by a predetermined percentage. Thus, during an OOB condition above the in-band area 152, step 1 may include bypassing the distribution line parameters R+jX to provide only the voltage measured V$_{MEASURED}$ for regulation of the load voltage 43; step 2 may include lowering the center-band voltage 153 by 2%; and step 3 may include again lowering the center-band voltage 153 by 2%, and so on until the load voltage 43 is regulated to the center-band voltage 153.

As noted above, one prior art method of adjusting the load voltage 43 includes simply lowering or raising the center-band voltage 153, depending on tap availability and the measured voltage V$_{MEASURED}$. According to an embodiment of the invention, the system voltage reduction method can also be achieved by an alternate relationship of V$_{CONTROLLER}$=V$_{MEASURED}$+V$_{REDUCTION}$·V$_{REDUCTION}$ is preferably expressed as a percentage of the center-band voltage 153 setting (e.g., 2% of a 120V center-band voltage setting), and may be either fixed or variable, depending on the controller design. The addition of V$_{REDUCTION}$ to V$_{MEASURED}$ yields a higher controller voltage V$_{CONTROLLER}$ and therefore a lower load or system voltage 43. Accordingly, multiple adjustments via V$_{REDUCTION}$ yields incremental decreases in the load voltage 43.

For example, if the center-band voltage 153 is 120 V with ±2V defining an in-band area (e.g., 118-122), if there are no more taps left to raise (to "tap up") the load voltage 43, and if the voltage measured by the voltage control device 100 is below the lower in-band area 157, for example, 117V, lowering the center-band voltage 153 to 113V enables a tap position change to 115V. Accordingly, the voltage control device 100 causes the voltage regulator 32 to "tap down" such that the measured voltage $V_{MEASURED}$ is adjusted downward to the new in-band area at 115V.

Rather than lowering the center-band voltage 153 however, the system voltage reduction can also be achieved by the alternate relationship of $V_{CONTROLLER}=V_{MEASURED}+V_{REDUCTION}$ disclosed herein. The addition of the $V_{REDUCTION}$ term causes the voltage control device 100 to assume a higher controller voltage $V_{CONTROLLER}$ for its calculations and thus causes the voltage regulator 32 to tap down. For example, if the voltage measured by the voltage control device 100 is 117V, and there are no taps available to raise the voltage measured by the voltage control device 100, the addition of $V_{REDUCTION}$ equal to 4% of the 120V center-band voltage, or 4.8V, to the measured voltage $V_{MEASURED}$ yields a controller voltage of 121.8V. Further additions of 4% of the 120V center-band voltage 153 to the measured voltage $V_{MEASURED}$ may be performed until the controller voltage falls between 118V and 122V. Subsequent controller voltages above 122V will cause the voltage regulator 32 to tap down.

As may be apparent from the above discussion, implementation of the apparatus and method disclosed herein enables improved voltage regulator control of load voltages 43, especially in those cases where an OOB condition exists and a tap limit is reached. Such improved voltage regulator control operates to provide smooth voltage reduction for use by the voltage control device 100.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for providing a voltage adjustment for single-phase voltage regulator operation of a voltage regulator operatively coupled to a single-phase distribution line of a three-phase power system, the voltage regulator including a plurality of taps selectable to adjust a voltage at a load of the single-phase distribution line to an in-band area, the apparatus comprising:
   a means for deriving a digitized voltage signal and a digitized current signal of the single-phase distribution line at the voltage regulator; and
   a microcontroller operatively coupled to the means for deriving, the microcontroller including a microprocessor and a memory operatively coupled to the microprocessor, the microcontroller being programmed to:
      determine a measured voltage and a measured current at the voltage regulator based on respective digitized voltage and current signals,
      determine a line voltage drop between the voltage regulator and the load if the measured voltage is in an out-of-band area above the in-band area, and
      if there are no available taps of the plurality of taps and the measured voltage is in the out-of-band area above the in-band area, utilize the measured voltage to adjust the voltage at the load.

2. The apparatus of claim 1, wherein utilization of the measured voltage bypasses an effect of the line voltage drop on the adjustment of the voltage at the load to yield a voltage reduction for single-phase voltage regulator operation of the voltage regulator.

3. The apparatus of claim 1, wherein the microcontroller is further programmed to lower a reference voltage defining the in-band area.

4. The apparatus of claim 1, wherein if there are no available taps and the measured voltage is in an out-of-band area below the in-band area, the microcontroller is further programmed to utilize the measured voltage plus a reduction voltage to adjust the voltage at the load.

5. The apparatus of claim 4, wherein the reduction voltage comprises a percentage of a center-band voltage of the in-band area.

6. The apparatus of claim 4, wherein utilization of the measured voltage plus the reduction voltage yields a voltage reduction for single-phase voltage regulator operation of the voltage regulator.

7. The apparatus of claim 1, wherein if there are available taps, the microcontroller is further programmed to utilize the measured voltage less the line voltage drop to determine a tap change of the plurality of taps when the measured voltage is in the out-of-band area above the in-band area.

8. The apparatus of claim 1, wherein the line voltage drop is equal to a product of a line impedance of the single-phase distribution line and a total current, wherein the total current is equal to a quotient of the measured voltage at the voltage regulator and a total impedance, and wherein the total impedance is equal to a sum of the line impedance and an impedance of the load.

9. The apparatus of claim 8, wherein the impedance of the load is transmitted to the microcontroller.

10. The apparatus of claim 1, wherein the line voltage drop is equal to a product of a line impedance of the single-phase distribution line and the measured current, and wherein the measured current is about equal to a total current at the voltage regulator.

11. The apparatus of claim 1, wherein the in-band area is adjustable between a first voltage value and a second voltage value.

12. An apparatus for providing a voltage adjustment for single-phase voltage regulator operation of a voltage regulator operatively coupled to a single-phase distribution line of a three-phase power system, the voltage regulator including a plurality of taps selectable to adjust a voltage at a load of the single-phase distribution line to an in-band area, the apparatus comprising:
   a means for deriving a digitized voltage signal and a digitized current signal of the single-phase distribution line at the voltage regulator; and
   a microcontroller operatively coupled to the means for deriving, the microcontroller including a microprocessor and a memory operatively coupled to the microprocessor, the microcontroller being programmed to:
      determine a measured voltage and a measured current at the voltage regulator based on the respective digitized voltage and current signals,
      determine a line voltage drop between the voltage regulator and the load if the measured voltage is in the out-of-band area above the in-band area,
      divide the line voltage drop by a tap voltage value of a single tap of the plurality of taps to form a required taps value, and
      if the required taps value is greater than a number of available taps of the plurality of taps, utilize the measured voltage less another line voltage drop to adjust the voltage at the load, the another line drop voltage less than the line drop voltage and based on the required taps value.

13. The apparatus of claim 12, wherein utilization of the measured voltage less the another line voltage drop reduces an effect of the line voltage drop on the adjustment of the voltage at the load to yield a voltage reduction for single-phase voltage regulator operation of the voltage regulator.

14. The apparatus of claim 12, wherein the microcontroller is further programmed to:
divide the number of available taps by the required taps value to form a line drop compensation adjustment value;
multiply a line impedance of the single-phase distribution line by the line drop compensation adjustment value to form another line impedance; and
multiply the another line impedance by a total current of the single-phase distribution line to calculate the another line voltage drop.

15. The apparatus of claim 12, wherein the line voltage drop is equal to a product of a line impedance of the single-phase distribution line and a measured current, and wherein the measured current is about equal to a total current at the voltage regulator.

16. The apparatus of claim 12, wherein the line voltage drop is equal to a product of the line impedance and the total current, wherein the total current is equal to a quotient of the measured voltage at the voltage regulator and a total impedance, and wherein the total impedance is equal to a sum of the line impedance and an impedance of the load.

17. The apparatus of claim 16, wherein the impedance of the load is transmitted to the microcontroller.

18. The apparatus of claim 12, wherein the microcontroller is further programmed to lower a reference voltage defining the in-band area.

19. The apparatus of claim 12, wherein if there are no available taps and the measured voltage is in an out-of-band area below the in-band area, the microcontroller is further programmed to utilize the measured voltage plus a reduction voltage to adjust the voltage at the load.

20. The apparatus of claim 19, wherein the reduction voltage comprises a percentage of a center-band voltage of the in-band area.

21. The apparatus of claim 12, wherein the in-band area is adjustable between a first voltage value and a second voltage value.

22. A method for providing a voltage adjustment for single-phase voltage regulator operation of a voltage regulator operatively coupled to a single-phase distribution line of a three-phase power system, the voltage regulator including a plurality of taps selectable to adjust a voltage at a load of the single-phase distribution line to an in-band area, the method comprising:
determining a measured voltage and a measured current at the voltage regulator based on a respective digitized voltage signal and a digitized current signal of the single-phase distribution line at the voltage regulator; and
if there are no available taps of the plurality of taps and the measured voltage is in the out-of-band area above the in-band area, eliminating an effect of a line voltage drop between the voltage regulator and the load to adjust the voltage at the load.

23. The method of claim 22, wherein the measured voltage is utilized to adjust the voltage at the load, the adjustment yielding a voltage reduction for single-phase voltage regulator operation of the voltage regulator.

24. The method of claim 22, further comprising lowering a reference voltage defining the in-band area.

25. The method of claim 22, further comprising utilizing the measured voltage plus a reduction voltage to adjust the voltage at the load if there are no available taps and the measured voltage is in an out-of-band area below the in-band area.

26. The method of claim 25, wherein the reduction voltage comprises a percentage of a center-band voltage of the in-band area.

27. The method of claim 25, wherein utilization of the measured voltage plus the reduction voltage yields a voltage reduction for single-phase voltage regulator operation of the voltage regulator.

28. The method of claim 22, further comprising utilizing the measured voltage less the line voltage drop to determine a tap change of the plurality of taps if the measured voltage is in the out-of-band area above the in-band area and if there are available taps.

29. The method of claim 22, wherein the line voltage drop is equal to a product of a line impedance of the single-phase distribution line and a total current, wherein the total current is equal to a quotient of the measured voltage at the voltage regulator and a total impedance, and wherein the total impedance is equal to a sum of the line impedance and an impedance of the load.

30. The method of claim 29, wherein the impedance of the load is transmitted to a microcontroller.

31. The method of claim 22, wherein the line voltage drop is equal to a product of a line impedance of the single-phase distribution line and a measured current, and wherein the measured current is about equal to a total current at the voltage regulator.

32. The method of claim 22, wherein the in-band area is adjustable between a first voltage value and a second voltage value.

33. A method for providing a voltage adjustment for single-phase voltage regulator operation of a voltage regulator operatively coupled to a single-phase distribution line of a three-phase power system, the voltage regulator including a plurality of taps selectable to adjust a voltage at a load of the single-phase distribution line to an in-band area, the method comprising:
determining a measured voltage and a measured current at the voltage regulator based on a respective digitized voltage signal and a digitized current signal of the single-phase distribution line at the voltage regulator;
determining a line voltage drop between the voltage regulator and the load if the measured voltage is in an out-of-band area above the in-band area; and
if there are no available taps of the plurality of taps, reducing an effect of the line voltage drop to adjust the voltage at the load.

34. The method of claim 33, wherein reducing the effect of the line voltage drop comprises:
dividing the line voltage drop by a tap voltage value of a single tap of the plurality of taps to form a required taps value; and
if the required taps value is greater than a number of available taps of the plurality of taps, utilizing the measured voltage less another line voltage drop to adjust the voltage at the load when the measured voltage is in the out-of-band area, the another line drop voltage less than the line drop voltage and based on the required taps value.

35. The method of claim 34, further comprising:
dividing the number of available taps by the required taps value to form a line drop compensation adjustment value;
multiplying a line impedance of the single-phase distribution line by the line drop compensation adjustment value to form another line impedance; and
multiplying the another line impedance by a total current of the single-phase distribution line to calculate the another line voltage drop.

36. The method of claim 34, wherein utilization of the measured voltage less the another line voltage drop reduces an effect of the line voltage drop on the adjustment of the voltage at the load to yield a voltage reduction for single-phase voltage regulator operation of the voltage regulator.

37. The method of claim 33, wherein the line voltage drop is equal to a product of a line impedance of the single-phase distribution line and a measured current, and wherein the measured current is about equal to a total current at the voltage regulator.

38. The method of claim 33, wherein the line voltage drop is equal to a product of the line impedance and the total current, wherein the total current is equal to a quotient of the measured voltage at the voltage regulator and a total impedance, and wherein the total impedance is equal to a sum of the line impedance and an impedance of the load.

39. The method of claim 38, wherein the impedance of the load is transmitted to the microcontroller.

40. The method of claim 33, further comprising lowering a reference voltage defining the in-band area.

41. The method of claim 33, wherein the in-band area is adjustable between a first voltage value and a second voltage value.

42. A method for providing a voltage reduction for single-phase voltage regulator operation of a voltage regulator operatively coupled to a single-phase distribution line of a three-phase power system, the voltage regulator including a plurality of taps selectable to adjust a voltage at a load of the single-phase distribution line from an out-of-band area above an in-band area to the in-band area, the method comprising:
determining a measured voltage and a measured current at the voltage regulator based on a respective digitized voltage signal and a digitized current signal of the single-phase distribution line at the voltage regulator;
determining a line voltage drop between the voltage regulator and the load if the measured voltage is in the out-of-band area;
if there are no available taps of the plurality of taps, utilizing the measured voltage to lower the voltage at the load when the measured voltage is in the out-of-band area; and
if there are available taps, utilizing the measured voltage less the line voltage drop to determine the tap change when the measured voltage is in the out-of-band area.

43. The method of claim 42, wherein utilization of only the measured voltage bypasses an effect of the line voltage drop to yield the voltage reduction for single-phase voltage regulator operation of the voltage regulator.

44. The method of claim 43, further comprising lowering a reference voltage defining the in-band area.

45. The method of claim 42, wherein the line voltage drop is equal to a product of a line impedance of the single-phase distribution line and a total current, wherein the total current is equal to a quotient of the measured voltage at the voltage regulator and a total impedance, and wherein the total impedance is equal to a sum of the line impedance and an impedance of the load.

46. The method of claim 42, wherein the line voltage drop is equal to a product of a line impedance of the single-phase distribution line and a measured current, and wherein the measured current is about equal to a total current at the voltage regulator.

47. A method for providing an incremental voltage reduction for single-phase voltage regulator operation of a voltage regulator operatively coupled to a single-phase distribution line of a three-phase power system, the voltage regulator including a plurality of taps selectable to adjust a voltage at a load of the single-phase distribution line from an out-of-band area above an in-band area to the in-band area, the method comprising:
determining a measured voltage and a measured current at the voltage regulator based on a respective digitized voltage signal and a digitized current signal of the single-phase distribution line at the voltage regulator;
if the measured voltage is in the out-of-band area:
determining a line voltage drop between the voltage regulator and the load;
dividing the line voltage drop by a tap voltage value of a single tap of the plurality of taps to form a required taps value; and
if the required taps value is greater than a number of available taps of the plurality of taps, incrementally reducing an effect of the line voltage drop to reduce the voltage at the load from the out-of-band area to the in-band area.

48. The method of claim 47, wherein the line voltage drop is equal to a product of a line impedance of the single-phase distribution line and a measured current, and wherein the measured current is about equal to a total current at the voltage regulator.

49. The method of claim 47, wherein the line voltage drop is equal to a product of the line impedance and the total current, wherein the total current is equal to a quotient of the measured voltage at the voltage regulator and a total impedance, and wherein the total impedance is equal to a sum of the line impedance and an impedance of the load.

50. The method of claim 47, further comprising the incremental voltage reduction for single-phase voltage regulator operation upon incrementally reducing the effect of the line voltage drop.

51. The method of claim 50, further comprising lowering the reference voltage of the in-band area.

52. The method of claim 47, wherein the tap change adjusts the voltage at the load.

* * * * *